United States Patent [19]

Douillet

[11] Patent Number: 4,724,675
[45] Date of Patent: Feb. 16, 1988

[54] CONTROL DEVICE FOR A TWIN MASTER CYLINDER

[75] Inventor: Christian Douillet, Puteaux, France

[73] Assignee: Bendix France, Paris, France

[21] Appl. No.: 827,127

[22] Filed: Feb. 6, 1986

[30] Foreign Application Priority Data

Feb. 20, 1985 [FR] France ................. 85 02462

[51] Int. Cl.⁴ ............................................. F15B 7/00
[52] U.S. Cl. .................................... 60/581; 74/470; 74/512; 74/582; 92/84; 92/133
[58] Field of Search ............. 60/581; 92/84, 133; 74/470, 512, 582

[56] References Cited

U.S. PATENT DOCUMENTS

| | | | |
|---|---|---|---|
| 537,346 | 4/1895 | Maag | 74/582 |
| 2,062,167 | 11/1936 | Dieter | 60/581 |
| 2,123,102 | 7/1938 | Feigley | 188/204 |
| 2,605,615 | 8/1952 | Meredith | 92/84 |
| 2,667,861 | 2/1954 | Rockwell | 92/84 |
| 3,168,011 | 2/1965 | Baumann | 92/133 |
| 3,220,189 | 11/1965 | Caramanna | |
| 3,278,240 | 10/1966 | Boyd | 60/581 |
| 3,543,298 | 11/1970 | Rockwell | |
| 3,613,520 | 10/1971 | Worden | 92/133 |
| 4,441,596 | 4/1984 | Nakahara | 74/512 |

FOREIGN PATENT DOCUMENTS

| | | |
|---|---|---|
| 2941781 | 5/1981 | Fed. Rep. of Germany . |
| 1163722 | 9/1969 | United Kingdom . |
| 2141505 | 12/1984 | United Kingdom . |

*Primary Examiner*—Abraham Hershkovitz
*Attorney, Agent, or Firm*—Larry J. Palguta; Ken C. Decker

[57] ABSTRACT

Control device (10) for a twin master cylinder (18) of the type with two master cylinders situated side by side and parallel to one another; the device (10) is capable of being positioned between an actuating pedal (12) and pistons (26, 26') of the master cylinders. According to the invention the device (10) incorporates a compensation (63, 63') of the travel of a control rod (52) situated on the same side as the pedal (12) relative to the travel of two independent push rods (34, 36') which are capable of acting upon each of the pistons (26, 26').

4 Claims, 3 Drawing Figures

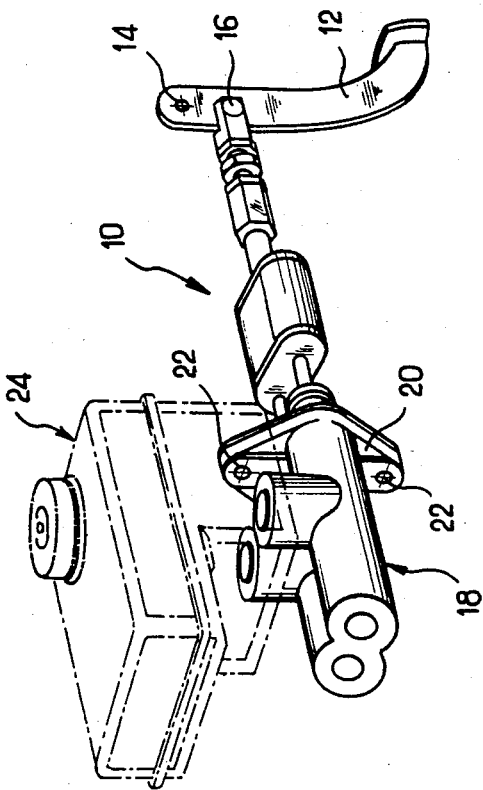
FIG_1
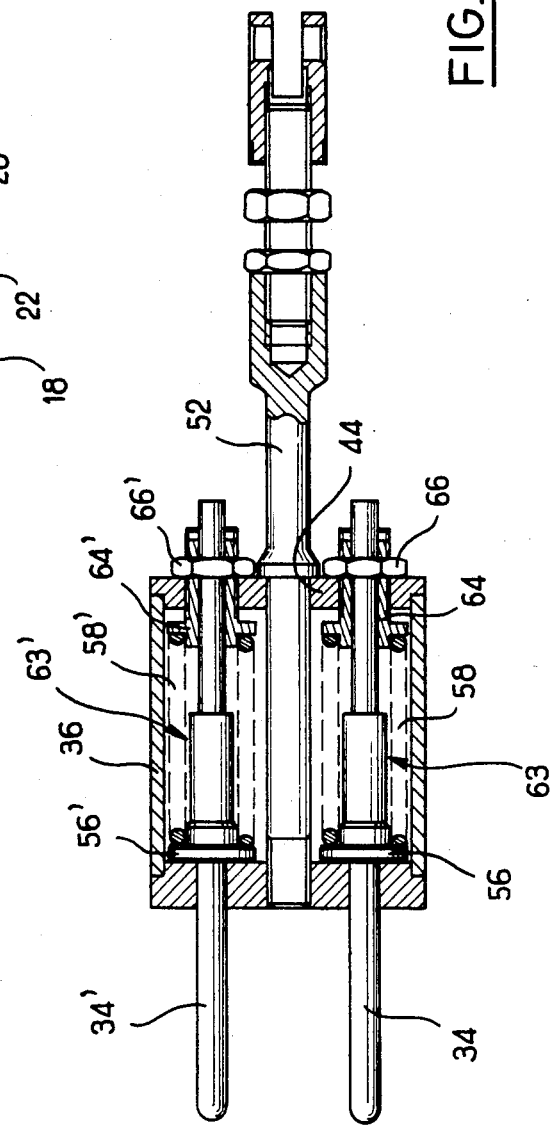
FIG_3

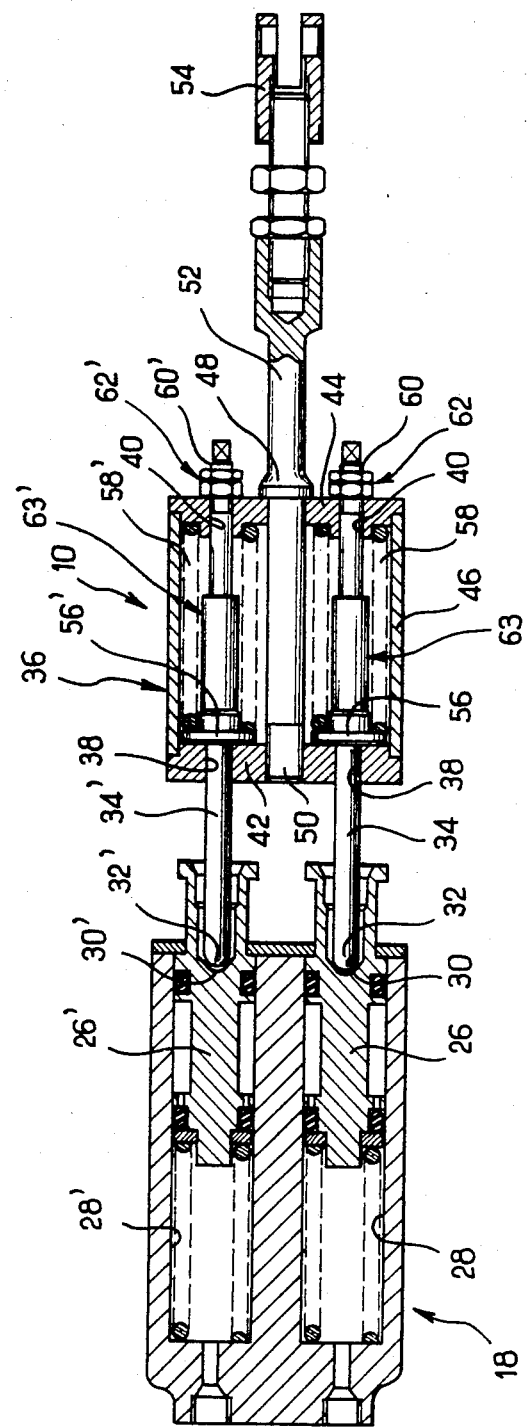
FIG_2

CONTROL DEVICE FOR A TWIN MASTER CYLINDER

The invention relates to a control device for a twin master cylinder particularly for a motor vehicle.

The invention concerns more particularly a control device for a twin master cylinder of the type with two master cylinders situated side by side and parallel to one another, this device being capable of being positioned between an actuating pedal and pistons of the master cylinder.

In this type of installation, the master cylinder is fixed to a fixed portion of the vehicle and the pedal is hinged, also relative to a fixed portion of the vehicle. The control device, situated between this pedal and the master cylinder, must be able to transmit forces without intermediate guidance, and the control device must therefore be rigid. If such a control device is constructed as a single solid component incorporating firstly, attachment to the pedal, and secondaly, two parallel push rods capable of actuating the pistons of the master cylinders, such a system has the major disadvantage of preventing any operation of the master cylinder if one of the pistons seizes in its bore. In addition, this type of master cylinder may control a pilot circuit which only requires a small displacement of fluid for its operation, that is to say a small travel at the pistons. However, as the pilot circuit works as a function of the pressure generated by the master cylinder, it is necessary to have high sensitivity at the actuating pedal in order to control correctly the pressure generated in the master cylinders.

For this purpose the invention proposes a control device allowing one master cylinder to operate if the other has seized, incorporating means of compensation of the travel of the pedal allowing the pressures in the master cylinder to be proportioned.

For this purpose the invention proposes a control device for a twin master cylinder of the type with two master cylinders situated side by side and parallel to one another, the device being capable of being positioned between an actuating pedal and the pistons of the master cylinders, characterized in that the device incorporates means of compensation of the travel of a control rod situated on the same side as the pedal relative to the travel of two independent push rods which are capable of acting upon each of the pistons.

It will be understood that owing to such a construction, the push rods being independent, if one of them has seized as the result of the seizure of the piston in its bore, the other rod can push normally the other of the pistons. In addition the push rods receive a force from the control rod without the travel of the control rod and the travel of the push rods being identical.

Other characteristics and advantages of the control device forming the subject of the present invention will emerge from the following description of two embodiments, given by way of illustration but not limiting in any way, with reference to the accompanying drawings, in which:

FIG. 1 is a perspective view of the control device forming the subject of the invention, positioned between a twin master cylinder and a brake pedal;

FIG. 2 is a partially sectioned view of the device shown in FIG. 1; and

FIG. 3 is a view similar to that shown in FIG. 2 for a second embodiment.

FIG. 1 shows in perspective a control device for a twin master cylinder, given as an assembly the reference 10, positioned between a brake pedal 12 which is capable of being mounted so as to be hinged to a fixed portion of the vehicle (not shown) by means of a hole 14 which s capable of accepting a support shaft. The connection between the control device 10 and the pedal 12 is provided by a shaft forming a pivot 16 passing through corresponding holes formed in the control device 10 and in the pedal 12. At its other end the control device cooperates with a master cylinder, given as an assembly the reference 18, which is capable of being fixed to a fixed portion of the vehicle (not shown) by means of a fixing flange 20 incorporating fixing holes 22. In a conventional manner the master cylinder 18 is supplied with brake fluid by means of a reservoir, given as an assembly the reference 24, which is shown symbolically in FIG. 1.

Refering to FIGS. 1 and 2 it is seen that the master cylinder 18 is of the twin type with two single master cylinders situated side by side and parallel to one another. Each of these master cylinders incorporates a piston 26, 26' which is capable of sliding in a bore 28, 28' formed in the body of the master cylinder. Each piston carries at its end on the same side as the control device a cavity 30, 30' with a spherical bottom with which a spherical end 32, 32' of each of two push rods 34 and 34' cooperates. The two push rods 34 and 34' are capable of sliding relative to a body or casing 36 of the control device 10 by means of bores 38 and 40 formed in walls 42 and 44 of the casing 36. In addition to the walls 42 and 44 the casing 36 incorporates a strut 46 against which the walls 42 and 44 are clamped by means of a shoulder 48 and of a threaded portion 50 formed on a control rod 52. This control rod 52 terminates in a fork 54 which is provided with holes and is capable of being fixed to the pedal 12 by means of a shaft forming a pivot 16. Each of the push rods 34 and 34' incorporates a shoulder 56, 56' which is pushed to the left, referring to FIG. 2, by s spring 58, 58' which bears at its other end against the wall 44. The portion of the push rod 34 or 34' which projects outside the casing 36 through the wall 44 is provided with a thread 60, 60' and nuts 62, 62' allowing relative positioning between the push rods 34 and 34' and the casing 36 of the control device 10. It is thus possible, owing to the thread 60 and to the nuts 62, to adjust the preload of the spring 58, this being true for each of the push rods 34 and 34'.

The assembly of the shoulder 56 (56'), the spring 58 (58') and the adjustment 60-62 (60'-62') forms a means of compensation 63 (63') of the travel of the control rod 52 relative to the push rods 34 (34').

When the brake pedal or actuating pedal is pressed, the control rod 52 is pushed to the left, referring to FIG. 2, and the casing 36 also moves to the left with the control rod 52. During a first stage, when the reaction forces of the pistons 26 and 26' are less than the preload of the springs 58 and 58' the assembly of the control rod 52, the casing 36, the push rods 34 and 34', together with the pistons 26 and 26' move simultaneously to the left. During a second stage, when the opposing forces due to the springs and to the pressure exerted in the master cylinders exceed the preload of the springs 58 and 58', relative movement appears between the push rods 34 and 34' and the casing 36 against the springs 58 and 58' which are compressed by the shoulders 56 and 56'. In this phase of operation, the travel of each of the pistons 26 and 26' is less than the travel of the control rod 52 but these pistons 26 and 26' receive the force defined by the control rod 52. An increase in the travel of the control rod 52 is therefore obtained, allowing better proportioning of the braking even when the travel of the pistons 26 and 26' is very small.

If one of the circuits fails, or if one of the pistons 26 or 26' becomes seized in its bore, the control rod 52 can still move to he left, referring to FIG. 2, and actuate the other circuit or the other piston which is intact and in working order. If one circuit has failed, that is to say there is no rise in pressure in the corresponding master cylinder, the corresponding push rod does not move relative to the casing 36 and the corresponding piston will be moved to the left, referring to FIG. 2, while the side in normal operating order will see a relative movement between the corresponding push rod and the casing 36. In the case of seizure of one of the pistons in the rest position as shown in FIG. 2, for example, when the control rod 52 is actuated, the piston is immobile and the corresponding push rod will be fixed relative to the master cylinder, and the control rod 52 moves with the casing 36 against the spring 58 or 58' which corresponds to the seized piston. The other circuit operates in the same manner as that just described.

It is seen that owing to the invention, it is possible to construct a means of compensation of, firstly, the travel of the control rod 52, and secondly, the travel of the piston 26, 26' according to a law which depends on the stiffness of the springs 58 and 58' and on the preload applied to the latter by means of the threaded connections and the nuts 60 and 62, respectively; the control device remains operational according to the same criteria if one of the circuits has filed either as a result of brake fluid leakage or as a result of a piston seizure.

Referring to FIG. 3 which shows a second embodiment of the invention, it is seen that the preload of the springs 58 and 58' is provided by a threaded bush 64 and 64' screwed into the wall 44 and equipped with a locknut 66, 66', the threaded bush 64, 64' incorporating a hole for guiding the push rods 34 and 34'. Owing to this construction, which also operates in a manner identical to that of the preceding embodiment, the position of the push rods 34 and 34' is fixed at rest relative to the casing 36 and allows pre-adjustment of the preload without changing the position of the rods 34 and 34' relative to the casing 36.

Although the present invention is described above in relation to two embodiments, it is not limited by them but on the contrary is capable of modifications and variants which will be apparent to a person versed in the art.

I claim:

1. A control device for a twin master cylinder of the type having two master cylinders situated side by side and parallel to one another, the control device positioned between an actuating pedal and pistons of the master cylinders, characterized in that the device includes means for compensating, relative to travel of two independent push rods disposed in the device, for travel of a control rod disposed on a side adjacent the pedal, the push rods capable of acting upon respective ones of the pistons, the compensating means disposed between the control rod and two independent push rods and including a casing fixed firmly to the control rod and separate from the two master cylinders and pistons, the control rod extending through the casing to be connected to opposing ends of the casing, the casing housing the two independent push rods which are guided slidingly therein, each of the push rods including a shoulder housed in the casing and pushed axially and directly by means of an adjustable elastic component, and each push rod having means for adjusting the load of the elastic component on the respective rod, the adjusting means disposed on the side adjacent the pedal and at the casing for externally accessible adjustment.

2. The control device according to claim 1, characterized in that the adjusting means is threaded and positions the respective rod relative to the casing.

3. The control device according to claim 1, characterized in that the adjusting means includes threaded bushes which support the respective elastic components and which are movable axially relative to the casing.

4. The control device according to claim 1, characterized in that the shoulders abuttingly engage the end of the casing disposed on a side opposite the pedal.

* * * * *